United States Patent
Choi et al.

(10) Patent No.: US 9,331,327 B2
(45) Date of Patent: *May 3, 2016

(54) SECONDARY BATTERY PACK
(71) Applicant: LG CHEM, LTD., Seoul (KR)
(72) Inventors: Jong Woon Choi, Cheongju-si (KR); Ju Hwan Baek, Cheongwon-gun (KR); Hyung Ku Yun, Daejeon (KR); Tae Wook Kim, Cheongwon-gun (KR)
(73) Assignee: LG CHEM, LTD., Seoul (KR)
( * ) Notice: Subject to any disclaimer, the term of this patent is extended or adjusted under 35 U.S.C. 154(b) by 168 days.

This patent is subject to a terminal disclaimer.

(21) Appl. No.: 14/164,763
(22) Filed: Jan. 27, 2014
(65) Prior Publication Data
US 2014/0141289 A1 May 22, 2014

Related U.S. Application Data

(63) Continuation of application No. PCT/KR2012/006125, filed on Aug. 1, 2012.

(30) Foreign Application Priority Data

Aug. 9, 2011 (KR) .................. 10-2011-0078982
Feb. 14, 2012 (KR) .................. 10-2012-0014786

(51) Int. Cl.
*H01M 2/34* (2006.01)
*H01M 10/04* (2006.01)
(Continued)

(52) U.S. Cl.
CPC ............... *H01M 2/34* (2013.01); *H01M 2/021* (2013.01); *H01M 2/0212* (2013.01);
(Continued)

(58) Field of Classification Search
CPC . H01M 2/021; H01M 2/0212; H01M 2/0215; H01M 2/0217; H01M 2/0267; H01M 2/0277; H01M 2/0287; H01M 2/0285; H01M 2/30; H01M 2/34; H01M 10/425; H01M 10/4257; H01M 10/04; H01M 10/0436; H01M 2200/00; H01M 2200/103; H01M 2200/106; Y10T 29/4911

See application file for complete search history.

(56) References Cited

U.S. PATENT DOCUMENTS

2009/0246621 A1  10/2009  Miebori
2012/0276420 A1  11/2012  Baek et al.

FOREIGN PATENT DOCUMENTS

EP   1 760 804 A1   3/2007
EP   2 725 639 A2   4/2014
(Continued)

OTHER PUBLICATIONS

International Search Report issued in PCT/KR2012/006125, mailed on Jan. 29, 2013.

*Primary Examiner* — Brittany Raymond
(74) *Attorney, Agent, or Firm* — Birch, Stewart, Kolasch & Birch, LLP

(57) ABSTRACT

Disclosed is a secondary battery pack including a battery cell having a cathode and anode terminal formed at one face having a sealed surplus portion and a protection circuit module (PCM) electrically connected to the cell via the cathode and anode terminal, wherein the PCM includes a board having a cathode terminal connection part connected to the cathode terminal and an anode terminal connection part connected to the anode terminal and an electrically insulative case configured to receive the board through an open face thereof. The board, connected to the cathode terminal and anode terminal of the battery cell via the cathode terminal connection part and the anode terminal connection part, is mounted to the sealed surplus portion of the cell in a state in which the board is disposed in the case so that the cathode and anode terminal are exposed through the open face of the case.

19 Claims, 6 Drawing Sheets

(51) Int. Cl.
*H01M 2/02* (2006.01)
*H01M 10/42* (2006.01)
*H01M 2/30* (2006.01)

(52) U.S. Cl.
CPC ......... *H01M 2/0215* (2013.01); *H01M 2/0217* (2013.01); *H01M 2/0277* (2013.01); *H01M 2/0285* (2013.01); *H01M 2/0287* (2013.01); *H01M 2/30* (2013.01); *H01M 10/04* (2013.01); *H01M 10/425* (2013.01); *H01M 10/4257* (2013.01); *H01M 2/0267* (2013.01); *H01M 10/0436* (2013.01); *H01M 2200/00* (2013.01); *H01M 2200/103* (2013.01); *H01M 2200/106* (2013.01); *Y10T 29/4911* (2015.01)

(56) References Cited

FOREIGN PATENT DOCUMENTS

| | | | |
|---|---|---|---|
| EP | 2 733 775 A2 | | 5/2014 |
| JP | 2006-228715 A | | 8/2006 |
| JP | 2008-159555 A | | 7/2008 |
| JP | 2009-252371 A | | 10/2009 |
| JP | 2011-70906 A | | 4/2011 |
| KR | 10-2010-0121336 | * | 11/2010 |
| KR | 10-2010-0121336 A | | 11/2010 |
| KR | 10-2011-0021433 A | | 3/2011 |
| KR | 10-2011-0066774 | * | 6/2011 |
| KR | 10-2011-0066774 A | | 6/2011 |
| KR | 20-2011-0007760 U | | 8/2011 |

* cited by examiner

SECONDARY BATTERY PACK

CROSS REFERENCE TO RELATED APPLICATIONS

This application is a Bypass Continuation of PCT International Application No. PCT/KR2012/006125 filed on Aug. 1, 2012, which claims priority under 35 U.S.C §119(a) to Patent Application No. 10-2011-0078982 filed in the Republic of Korea on Aug. 9, 2011, and under 35 U.S.C §119(a) to Patent Application No. 10-2012-0014786 filed in the Republic of Korea on Feb. 14, 2012, all of which are hereby expressly incorporated by reference into the present application.

TECHNICAL FIELD

The present invention relates to a secondary battery pack.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as various kinds of mobile devices.

Depending upon kinds of devices in which secondary batteries are used, the secondary batteries may be configured to have a detachable type structure in which the secondary batteries can be easily inserted into and removed from external devices or to have an embedded type structure in which the secondary batteries are embedded in the devices. For example, secondary batteries used in the conventional mobile devices are configured to have a detachable type structure in which it is possible for a user to insert or remove a battery into or from each device. On the other hand, secondary batteries used in devices, such as some mobile phones, tablet PCs, and smart pads, may be configured to have an embedded type structure.

Lithium secondary batteries are widely used as such secondary batteries. Each of the secondary batteries includes an anode terminal and a cathode terminal electrically connected to a device, in which the secondary battery is mounted, and a safety element to effectively control an abnormal state, such as overcharge or overcurrent, of the secondary battery. Examples of the safety element may include a positive temperature coefficient (PTC) element, a protection circuit module (PCM), a fuse, and a thermal cutoff (TCO) element.

Generally, a safety element, such as a PCM, is connected to a battery cell, including an anode terminal and a cathode terminal, via a conductive nickel plates by welding or soldering. For example, the nickel plates are connected to the electrode terminals of the battery cell by welding or soldering, a protection circuit board (PCB) is attached to one side of a double-sided tape, a protective tape is attached to the other side of the double-sided tape, and electrode tabs of the PCB and the nickel plates are connected to each other by welding in a state in which the PCB is in tight contact with the battery cell. In this way, the PCM is connected to the battery cell to manufacture a battery pack.

It is required for the PCM to be maintained in electrical connection with the electrode terminals of the battery cell and, at the same time, to be electrically isolated from other parts of the battery cell. To this end, insulative tapes are attached to various members, including the PCM. In addition, a sealed portion of a battery case is partially bent, and an insulative tape is attached thereon or a barcode is printed thereon. That is, the process is very complicated.

Since a plurality of insulative tapes or parts is required to achieve safe connection between the safety element and the battery cell as described above, a battery pack assembly process is complicated, and manufacturing cost is increased. Also, when external impact is applied to a battery pack, the PCM may be damaged or dimensional stability may be greatly lowered due to the use of the insulative tapes, which exhibit low mechanical strength.

DISCLOSURE

Technical Problem

It is an object of the present invention to provide a secondary battery pack that is capable of covering a protection circuit board of a secondary battery cell using an electrically insulative case, thereby protecting the protection circuit board from external impact, insulating the protection circuit board, and preventing electrode terminals of the secondary battery cell from being exposed outside.

It is another object of the present invention to provide a secondary battery pack that is capable of reducing the number of parts necessary to constitute the battery pack, thereby simplify an assembly process and exhibiting excellent structural stability.

It is another object of the present invention to provide a secondary battery pack configured to have a structure in which a protection circuit module including a protection circuit board and a case, in which the protection circuit board is disposed, is mounted to an outer circumference of a battery cell, thereby providing maximum capacity in the same standard.

It is a further object of the present invention to provide a protection circuit module that is capable of a protection circuit module that is capable of protecting a safety element from external impact, exhibiting dimensional stability, and preventing wrinkles from being formed at an outer face of a battery pack.

Technical Solution

A secondary battery pack according to an embodiment of the present invention includes a battery cell having a cathode terminal and an anode terminal formed at one face having a sealed surplus portion and a protection circuit module (PCM) electrically connected to the battery cell via the cathode terminal and the anode terminal.

In this embodiment, the PCM may include a board having a cathode terminal connection part connected to the cathode terminal and an anode terminal connection part connected to the anode terminal and an electrically insulative case configured to receive the board through an open face thereof.

In this embodiment, the board, connected to the cathode terminal and the anode terminal of the battery cell via the cathode terminal connection part and the anode terminal connection part, may be mounted to the sealed surplus portion of the battery cell in a state in which the board is disposed in the case so that the cathode terminal and the anode terminal are exposed through the open face of the case.

In this embodiment, the anode terminal connection part of the PCM may be connected to the anode terminal of the battery cell via a safety element. The safety element may be a first safety element or a second safety element. In this case, the anode terminal connection part may be a second safety element connection part.

In this embodiment, the first safety element may be a protection circuit.

In this embodiment, the second safety element may be a positive temperature coefficient (PTC) element, a fuse, or a thermal cutoff (TCO) element.

In this embodiment, the battery cell may be a plate-shaped battery cell, and the anode terminal and the cathode terminal may be plate-shaped conductive members.

In this embodiment, the electrically insulative case may be provided with a mounting groove, in which the board and a safety element are mounted through the open face.

In this embodiment, the board may further include an external input and output terminal.

In this embodiment, the external input and output terminal may be formed on the board at which the anode terminal connection part and the cathode terminal connection part are formed.

In this embodiment, the external input and output terminal may be formed at the other face of the board at which the anode terminal connection part and the cathode terminal connection part are formed.

Also, the external input and output terminal may be formed at the board at which the cathode terminal connection part and the anode terminal connection part are formed via an interconnection part.

In this embodiment, the secondary battery pack may further include an insulative tape additionally attached to at least one of outer faces of the case.

In this embodiment, the battery cell may be configured to have a structure in which an electrode assembly, including cathodes, anodes, and separators respectively disposed between the cathodes and the anodes, is disposed in a battery case made of a laminate sheet including a metal layer and a resin layer in a sealed state.

In this embodiment, the external input and output terminal may be connected to one face of the board, and the board may be provided at the other face thereof with the cathode terminal connection part and a safety element connection part formed at positions corresponding to the cathode terminal and a safety element.

In this embodiment, the secondary battery pack may further include nickel plates additionally mounted to the cathode terminal connection part and the anode terminal connection part of the board by ultrasonic welding.

In this embodiment, the secondary battery pack may further include a label to cover the battery cell. The label is configured to have a structure to cover sealed outer circumferences of the battery cell and the PCM.

Also, the label may be configured to have a sheet structure including a first attachment face to cover one of opposite major faces of the battery cell, second and third attachment faces extending from the first attachment face to cover opposite side faces of the battery cell, and a fourth attachment face extending from the first attachment face to cover the PCM.

A protection circuit module according to another embodiment of the present invention includes a protection circuit board having a cathode terminal connection part and an anode terminal connection part connected to a cathode terminal and an anode terminal of a battery cell, respectively and an electrically insulative case configured to receive the protection circuit board through an open face thereof.

In the protection circuit module according to this embodiment, the protection circuit board may be disposed in the electrically insulative case in a state in which the protection circuit board is parallel to the battery cell, and may be mounted to a sealed surplus portion of the battery cell.

In the protection circuit module according to this embodiment, the anode terminal connection part of the protection circuit module may be connected to the anode terminal of the battery cell via a safety element.

In the protection circuit module according to this embodiment, the electrically insulative case may be provided with a mounting groove, in which the protection circuit board and a safety element are mounted through the open face.

A method of manufacturing a secondary battery pack according to a further embodiment of the present invention includes a step of forming a battery cell configured to have a structure in which an electrode assembly, including cathodes, anodes, and separators respectively disposed between the cathodes and the anodes, is disposed in a battery case in a sealed state, one of sealed outer circumferences of the battery cell having a surplus portion, a step of receiving a board, connected to a cathode terminal and an anode terminal of the battery cell via a cathode terminal connection part and an anode terminal connection part, into a case so that the cathode terminal and the anode terminal are exposed through an open face of the case, and a step of mounting the case to the sealed surplus portion of the battery cell.

Advantageous Effects

As is apparent from the above description, the secondary battery pack according to the present invention is configured so that the protection circuit board is disposed in the electrically insulative case. Consequently, it is possible to protect and insulate the protection circuit board. Also, it is possible to easily prevent the electrode terminals from being exposed outside without insulation of the electrode terminal through the use of additional members.

Also, the secondary battery pack according to the present invention is configured to have a structure in which the PCM, in which the protection circuit board is disposed in a single case, is mounted to the sealed surplus portion of the battery cell. Consequently, it is possible to effectively protect the PCM and to greatly improve manufacturing efficiency.

Furthermore, the secondary battery pack according to the present invention is configured to have a structure in which the protection circuit board is mounted in the case. Consequently, it is possible to easily manufacture the secondary battery pack, to relatively reduce a defect rate, and to configure the secondary battery pack so that the secondary battery pack has no wrinkles formed at the outer face thereof, i.e. a neat and clean external appearance.

In addition, the secondary battery pack according to the present invention is configured to have a structure in which the protection circuit board is mounted to one of the outer circumferences, e.g. one of the sealed portions, of the battery cell. Consequently, it is possible to reduce the length of the sealed portion and to increase the capacity of the secondary battery pack per unit volume.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the embodiments will be described only for a better understanding of the present invention, and therefore, the scope of the present invention is not limited by the illustrated embodiments.

A secondary battery pack according to an embodiment of the present invention includes a battery cell having four sealed outer circumferences and a safety element mounted to a sealed outer circumference having a surplus portion, which is one of the outer circumferences. A safety element according to an embodiment of the present invention may include a first safety element and a second safety element. The first safety element may be a protection circuit, and the second safety element may be a positive temperature coefficient (PTC) element, a fuse, or a thermal cutoff (TCO) element. Also, the second safety element may be mounted in a protection circuit module (PCM) in the form of a part.

The safety element according to the embodiment of the present invention may be a PCM. The PCM may include a protection circuit board and a case, in which the protection circuit board is disposed. For the convenience of description, a PCM will be described as being adopted as the safety element, and the PCM will be described as including a protection circuit board (PCB) in this specification, to which, however, the safety element according to the embodiment of the present invention is not limited.

Hereinafter, a secondary battery pack according to an embodiment of the present invention will be described with reference to FIGS. 1 to 10.

Figure 1:
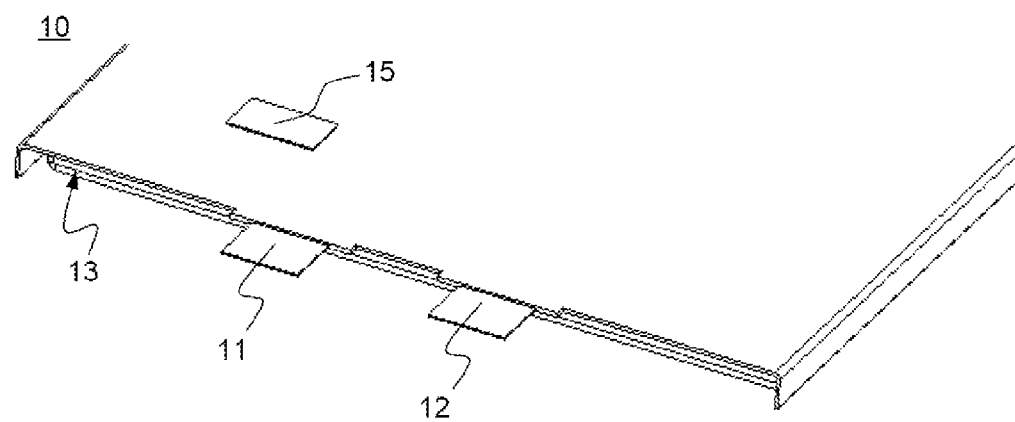
FIG. 1 is a partial perspective view of a battery cell.
Figure 2:
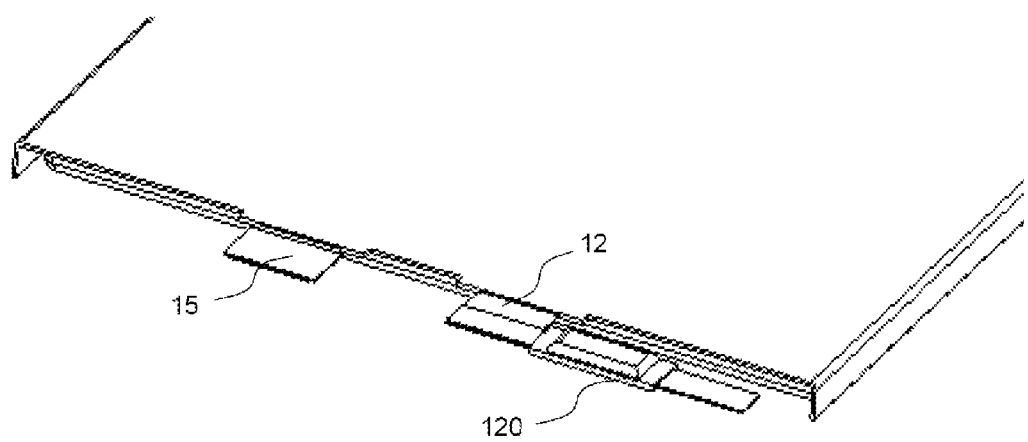
FIG. 2 is a partial perspective view showing that a safety element is coupled to the battery cell.
Figure 3:
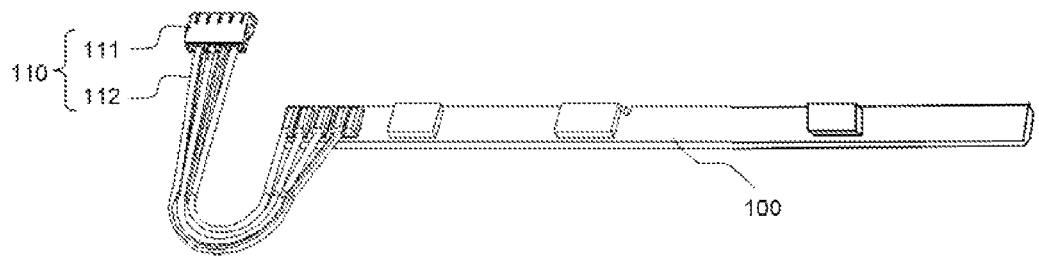
FIG. 3 is a partial perspective view showing that an external input and output terminal is coupled to a protection circuit board (PCB)
Figure 4:
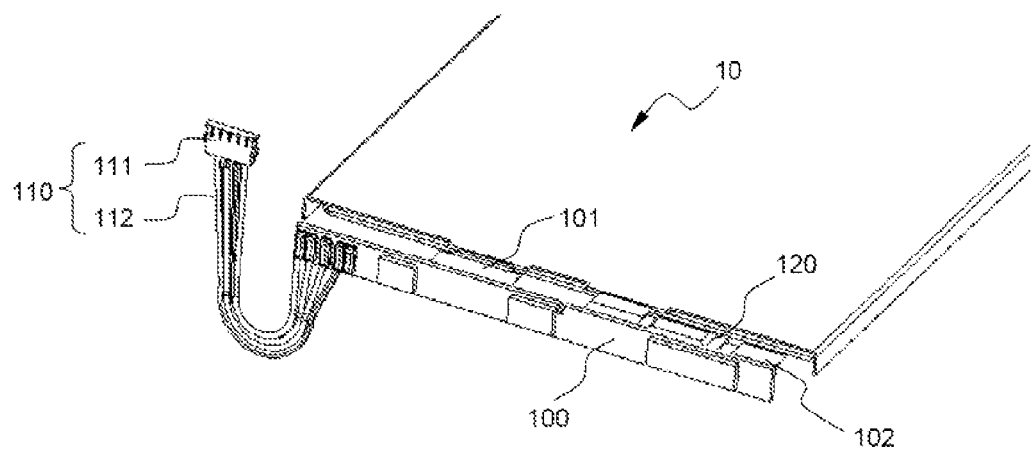
FIG. 4 is a partial perspective view showing that the PCB and the safety element are coupled to the upper end of the battery cell.

FIG. 1 is a partial perspective view of a battery cell, FIG. 2 is a partial perspective view showing that a safety element is coupled to the battery cell, FIG. 3 is a partial perspective view showing that an external input and output terminal is coupled to a protection circuit board (PCB), and FIG. 4 is a partial perspective view typically showing that the PCB and the safety element are coupled to the upper end of the battery cell.

Referring to these drawings, a battery cell 10 is a plate-shaped battery cell having an anode terminal 12 and a cathode terminal 11 formed at one end thereof.

A battery cell 10 according to an embodiment of the present invention is a pouch-shaped battery cell configured so that an electrode assembly of a cathode/separator/anode structure is disposed in a battery case made of a laminate sheet including a metal layer and a resin layer in a sealed state, to which, however, the battery cell according to the embodiment of the present invention is not limited.

Referring to FIG. 1, the battery cell 10 includes a sealed surplus portion 13 formed at one face thereof and an anode terminal 12 and a cathode terminal 11 exposed to the sealed surplus portion 13. The term 'face' used in this specification indicates an arbitrary face of a tetrahedron with four faces, and is understood as including a side, a section, or an end. Also, in this specification, a sealed portion having a surplus space formed at one of the sealed outer circumferences formed when an electrode assembly is disposed in a battery case made of a laminate sheet in a sealed state is referred to as a sealed surplus portion 13. However, a person having ordinary skill in the art to which the present invention pertains will appreciate that the sealed surplus portion may be replaced by terms, such as a thermal welded surplus portion and a sealed terrace, as long as the specified terms have the same meaning as the sealed surplus portion.

Also, as shown in FIG. 1, the sealed surplus portion 13 may be formed by extending a sealed portion formed at one arbitrary face of the battery cell in a direction perpendicular to the lengthwise direction of the face.

As shown in FIGS. 1 to 4, a nickel plate 15 may be further mounted to one face of the cathode terminal 11 of the battery cell 10, to which a cathode terminal connection part 101 is coupled, by ultrasonic welding.

Meanwhile, an external input and output terminal 110 including an interconnection part 112, formed in the shape of a wire, having a connector 111 mounted to one end thereof may be connected to one end of a PCB 100, and a cathode terminal connection part 101, which is made of a nickel plate, and a safety element connection part 102, which is made of a nickel plate, may be formed at positions corresponding to the cathode terminal 11 and a safety element 120.

Also, the interconnection part 112 of the external input and output terminal 110 may be formed in various shapes, such as a plate, in addition to the wire. Also, in a case in which no second safety element is added to the PCB, the PCB may include a cathode terminal connection part and an anode terminal connection part.

As shown in FIG. 4, the safety element connection part 102, which is connected to the PCB 100, are bent. An example of the safety element 120 may be a positive temperature coefficient (PTC) element or a fuse.

Figure 5:
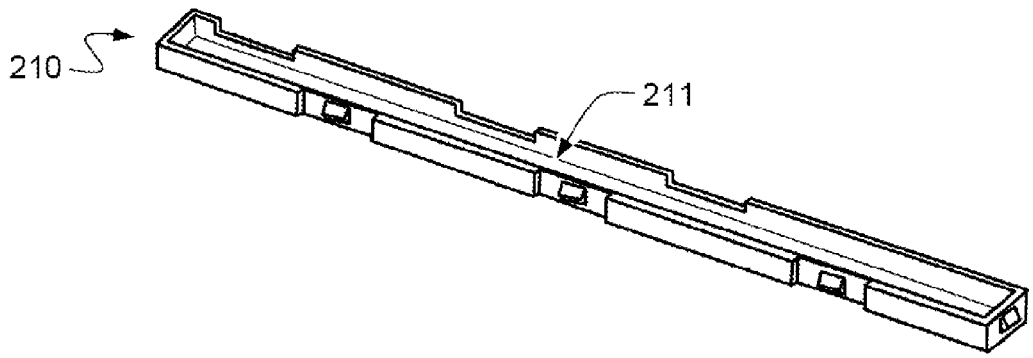
FIG. 5 is a perspective view showing an electrically insulative case.
Figure 6:
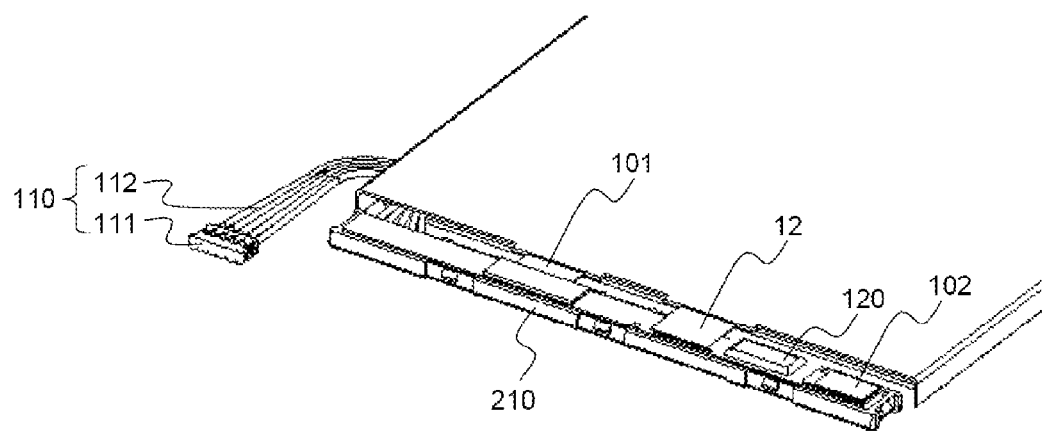
FIG. 6 is a partial perspective view showing that the PCB and the safety element of FIG. 4 are mounted to the electrically insulative case.
Figure 7:
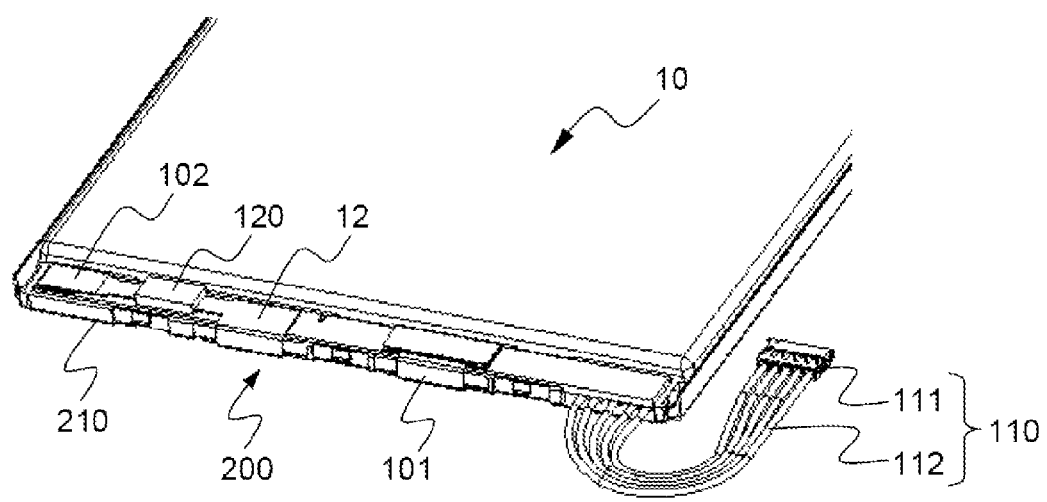
FIG. 7 is a partial perspective view showing a state in which a protection circuit module (PCM) of FIG. 6 is mounted to a thermally welded surplus portion of the battery cell.

FIG. 5 is a perspective view showing an electrically insulative case, FIG. 6 is a partial perspective view showing that the PCB and the safety element of FIG. 4 are mounted to the electrically insulative case, and FIG. 7 is a partial perspective view showing a state in which a protection circuit module (PCM) of FIG. 6 is mounted to a thermally welded surplus portion of the battery cell.

Referring to these drawings, the secondary battery pack according to the embodiment of the present invention may include a case 210 to receive the PCB 100 and the safety element 120 while surrounding the PCB 100 and the safety element 120.

As an example of the case 210, as shown in FIG. 5, an electrically insulative case 210 is opened at one face thereof. Also, the electrically insulative case 210 may have a mounting groove 211, in which the PCB 100 and the safety element 120 are mounted through the open face.

Also, as shown in FIG. 7, in the secondary battery pack according to the embodiment of the present invention, the PCM 200, including the PCB 100 and the safety element 120 disposed in the case 210, may be mounted to the sealed surplus portion 13 of the battery cell 10.

Also, the case 210 according to the embodiment of the present invention may be formed approximately in the shape of a box having a length corresponding to that of one face of the battery cell at which the sealed surplus portion is formed. Alternatively, the length of the case 210 may be greater or less than that of the sealed surplus portion.

Specifically, as shown in FIG. 7, in the secondary battery pack according to the embodiment of the present invention, the secondary battery pack according to the embodiment of the present invention, the PCM 200, including the PCB 100 and the safety element 120 disposed in the case 210, may be mounted to the sealed surplus portion 13 of the battery cell 10, for example, by bending the electrode terminals 11 and 12.

Consequently, the secondary battery pack according to the embodiment of the present invention is configured so that the PCM 200, in which the protection circuit board electrically connected to the cathode terminal and the anode terminal of the battery cell is disposed in the case, is mounted to the sealed surplus portion formed at one face of the battery cell. Consequently, it is possible to effectively protect the PCM and to greatly reduce the number of parts constituting the secondary battery pack, thereby greatly improving manufacturing efficiency, as compared with the conventional secondary battery pack.

Also, the secondary battery pack according to the present invention is configured so that the protection circuit board is disposed in the electrically insulative case. Consequently, it is possible to protect and insulate the PCM including the protection circuit board. Also, it is possible to easily prevent the electrode terminals from being exposed outside without insulation of the electrode terminals through the use of additional members.

Furthermore, the secondary battery pack according to the present invention is configured so that the protection circuit board is mounted in the case. Consequently, it is possible to easily manufacture the secondary battery pack, to relatively reduce a defect rate, and to configure the secondary battery pack so that the secondary battery pack has no wrinkles formed at the outer face thereof, i.e. a neat and clean external appearance, as compared with the conventional secondary battery pack in which the PCM is insulated using a tape.

In addition, the secondary battery pack according to the present invention is configured so that the protection circuit board is mounted to the sealed surplus portion formed at one face of the battery cell. Consequently, it is possible to reduce the length of the sealed surplus portion and to increase the capacity of the battery pack per unit volume, as compared with the conventional secondary battery pack.

Meanwhile, in a general process of assembling the secondary battery pack, the connection members and the PCM are coupled, and an insulative tape is attached at each step, to the PCM assembly is mounted to the battery cell, as previously described. That is, the PCM assembly is mounted to the battery cell using a plurality of parts with the result that a plurality of processes is required, and structural stability as well as mechanical strength is low.

On the other hand, the protection circuit module according to the present invention is configured to have a structure in which the protection circuit board is mounted in the case, and therefore, it is possible to improve structural stability of the battery pack, to greatly simplify the process of manufacturing the battery pack, to secure excellent insulativity, and to maximize the capacity of the battery cell in the battery pack having the same standard as the conventional battery pack.

Figure 8:
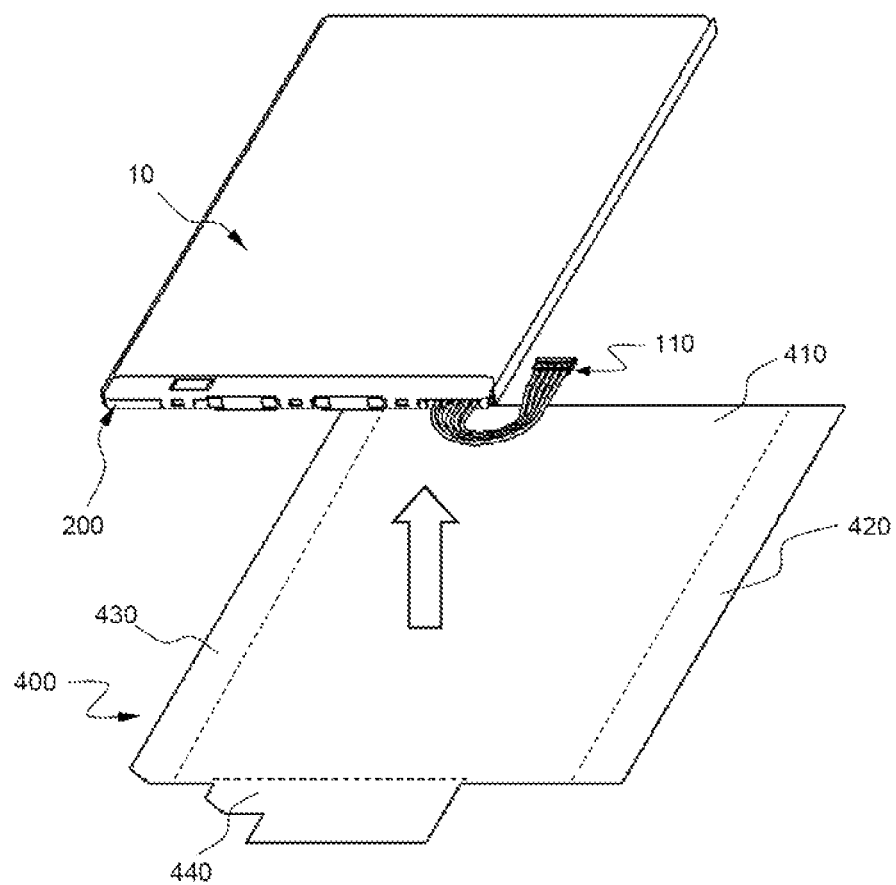
FIGS. 8 to 10 are typical views showing a label attachment process.
Figure 9:
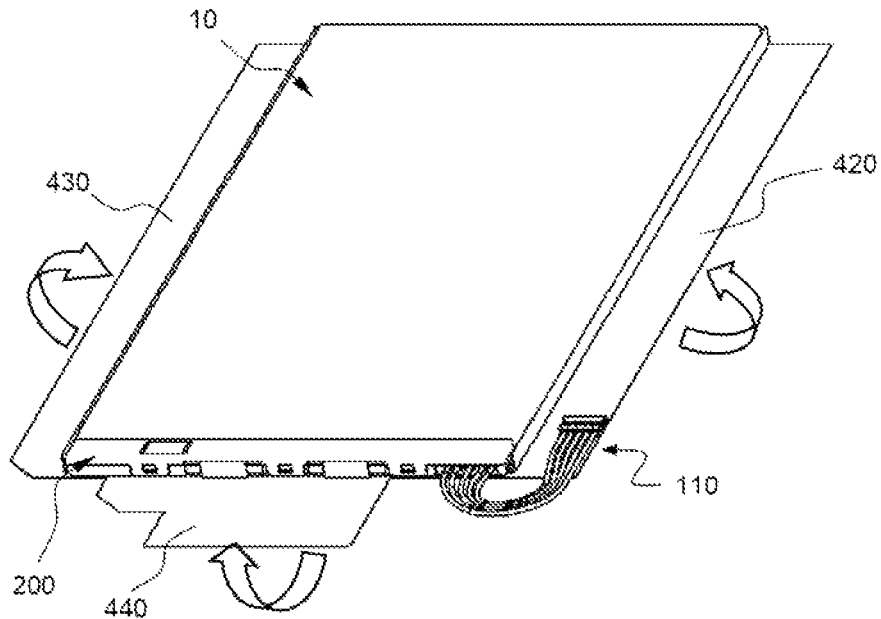
Figure 10:
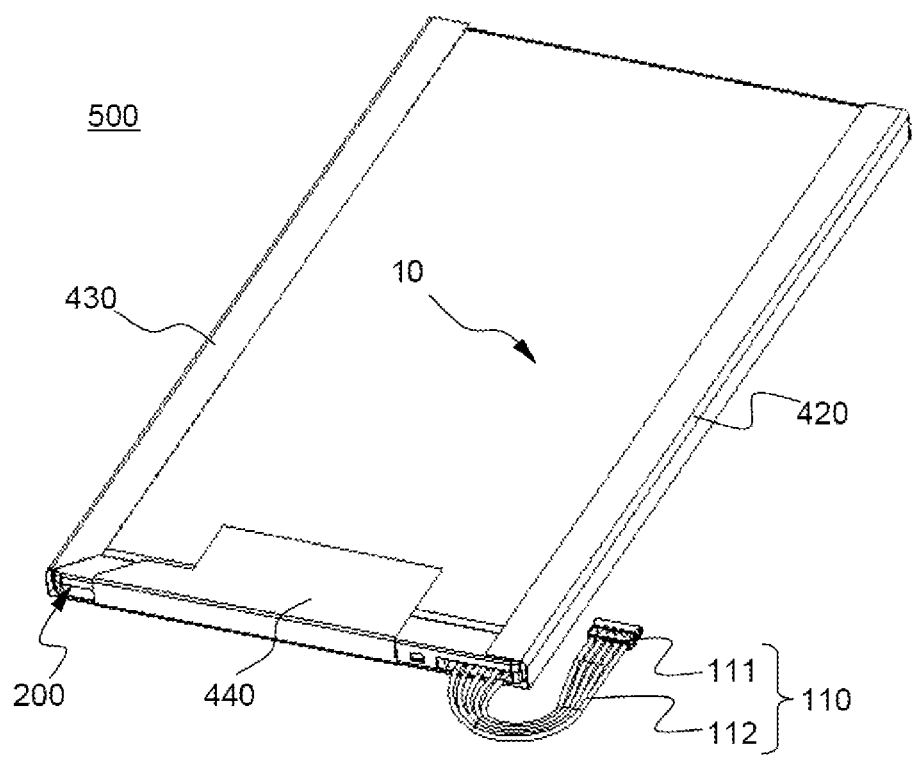

FIGS. 8 to 10 are views typically showing a process of attaching a label to the battery cell manufactured as shown in FIG. 7.

Referring to these drawings, a label 400 may be configured to have a sheet structure including a first attachment face 410 to cover one of opposite major faces of the battery cell 10, second and third attachment faces 420 and 430 extending from the first attachment face 410 to cover opposite side faces of the battery cell 10, and a fourth attachment face 440 extending from the first attachment face 410 to cover the PCM 200.

Consequently, one of the opposite major faces of the battery cell 10 is placed on the first attachment face 410, the second and third attachment faces 420 and 430 are bent and attached to the opposite side faces of the battery cell 10 so as to cover the opposite side faces of the battery cell 10, and the fourth attachment face 440 is bent and attached to the PCM so as to cover the PCM. In this way, the label 400 may be attached to the battery cell 10.

The label 400, showing product information, more stably secures the electrical connection state between the electrode terminals of the battery cell and the PCB while maintaining the insulation state at the opposite side faces of the battery cell 10 as well as the outer face of the battery cell 10.

Figure 11:
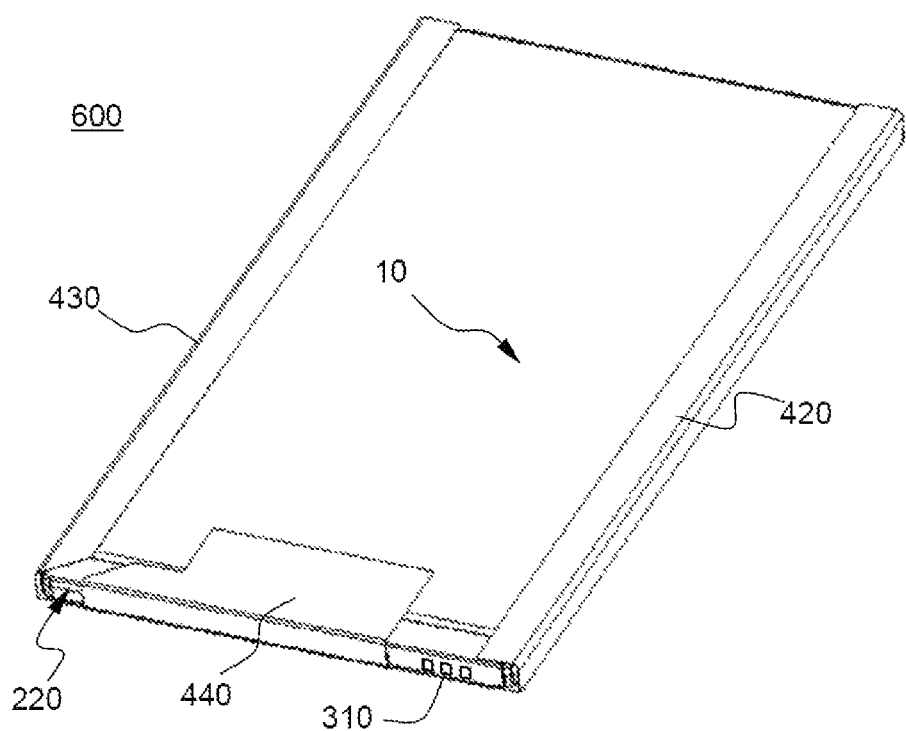
FIG. 11 is a perspective view of a secondary battery pack according to another embodiment of the present invention.

FIG. 11 is a perspective view of a secondary battery pack according to another embodiment of the present invention configured so that an external input and output terminal is mounted to a PCB. Referring to FIG. 11, as previously described, a secondary battery pack 600 is configured to have a structure in which an external connection terminal 310 is formed at one face of the PCB (not shown) so that the external connection terminal 310 is exposed outside through a PCM case 220.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
   a battery cell having a cathode terminal and an anode terminal formed at one face having a sealed surplus portion; and
   a protection circuit module (PCM) electrically connected to the battery cell via the cathode terminal and the anode terminal, wherein
   the PCM comprises:
      a board having a cathode terminal connection part connected to the cathode terminal and an anode terminal connection part connected to the anode terminal; and
      an electrically insulative case configured to receive the board through an open face thereof, and
   the board, connected to the cathode terminal and the anode terminal of the battery cell via the cathode terminal connection part and the anode terminal connection part, is mounted to the sealed surplus portion of the battery cell in a state in which the board is disposed in the case so that the cathode terminal and the anode terminal are exposed through the open face of the case,
   the electrically insulative case is provided with a mounting groove, in which the board and a safety element are mounted through the open face, and
   the battery cell is configured to have a structure in which an electrode assembly, comprising cathodes, anodes, and separators respectively disposed between the cathodes and the anodes, is disposed in a battery case made of a laminate sheet comprising a metal layer and a resin layer in a sealed state.

2. The secondary battery pack according to claim 1, wherein the anode terminal connection part of the PCM is connected to the anode terminal of the battery cell via the safety element.

3. The secondary battery pack according to claim 2, wherein the safety element is a first safety element or a second safety element.

4. The secondary battery pack according to claim 3, wherein the first safety element is a protection circuit.

5. The secondary battery pack according to claim 3, wherein the second safety element is a positive temperature coefficient (PTC) element, a fuse, or a thermal cutoff (TCO) element.

6. The secondary battery pack according to claim 1, wherein the battery cell is a plate-shaped battery cell, and the anode terminal and the cathode terminal are plate-shaped conductive members.

7. The secondary battery pack according to claim 1, wherein the board further comprises an external input and output terminal.

8. The secondary battery pack according to claim 7, wherein the external input and output terminal is formed on the board at which the anode terminal connection part and the cathode terminal connection part are formed.

9. The secondary battery pack according to claim 7, wherein the external input and output terminal is formed at the other face of the board at which the anode terminal connection part and the cathode terminal connection part are formed.

10. The secondary battery pack according to claim 7, wherein the external input and output terminal is formed at the board at which the cathode terminal connection part and the anode terminal connection part are formed via an interconnection part.

11. The secondary battery pack according to claim 7, wherein the external input and output terminal is connected to one face of the board, and the board is provided at the other face thereof with the cathode terminal connection part and a safety element connection part formed at positions corresponding to the cathode terminal and the safety element.

12. The secondary battery pack according to claim 11, further comprising nickel plates additionally mounted to the cathode terminal connection part and the anode terminal connection part of the board by ultrasonic welding.

13. The secondary battery pack according to claim 1, further comprising an insulative tape additionally attached to at least one of outer faces of the case.

14. The secondary battery pack according to claim 1, further comprising a label to cover the battery cell.

15. The secondary battery pack according to claim 14, wherein the label is configured to have a structure to cover sealed outer circumferences of the battery cell and the PCM.

16. The secondary battery pack according to claim 15, wherein the label is configured to have a sheet structure comprising a first attachment face to cover one of opposite major faces of the battery cell, second and third attachment faces extending from the first attachment face to cover opposite side faces of the battery cell, and a fourth attachment face extending from the first attachment face to cover the PCM.

17. A method of manufacturing the secondary battery pack according to claim 1, the method comprising:
a step of forming the battery cell configured to have the structure in which the electrode assembly, comprising cathodes, anodes, and separators respectively disposed between the cathodes and the anodes, is disposed in the battery case in the sealed state, one of sealed outer circumferences of the battery cell having the surplus portion;
a step of receiving the board, connected to the cathode terminal and the anode terminal of the battery cell via the cathode terminal connection part and the anode terminal connection part, into the case so that the cathode terminal and the anode terminal are exposed through the open face of the case; and
a step of mounting the case to the sealed surplus portion of the battery cell.

18. A protection circuit module comprising:
a protection circuit board having a cathode terminal connection part and an anode terminal connection part connected to a cathode terminal and an anode terminal of a battery cell, respectively; and
an electrically insulative case configured to receive the protection circuit board through an open face thereof, wherein
the protection circuit board, connected to the cathode terminal and the anode terminal of the battery cell via the cathode terminal connection part and the anode terminal connection part, is mounted to a sealed surplus portion of the battery cell in a state in which the protection circuit board is disposed in the case so that the cathode terminal and the anode terminal are exposed through the open face of the case, and
the electrically insulative case is provided with a mounting groove, in which the protection circuit board and a safety element are mounted through the open face.

19. The protection circuit module according to claim 18, wherein the anode terminal connection part of the protection circuit module is connected to the anode terminal of the battery cell via the safety element.

* * * * *